United States Patent
Geis et al.

(10) Patent No.: US 7,111,434 B2
(45) Date of Patent: Sep. 26, 2006

(54) METHOD FOR PRODUCING A PANEL SUBSTANTIALLY STRETCHED ON A FRAME AND RESULTING PANEL

(75) Inventors: Bernard Geis, Mulhouse (FR); Alexandre Katz, Mulhouse (FR)

(73) Assignee: CLIPSO Swiss AG, (CH)

( * ) Notice: Subject to any disclaimer, the term of this patent is extended or adjusted under 35 U.S.C. 154(b) by 353 days.

(21) Appl. No.: 10/415,965

(22) PCT Filed: Nov. 5, 2001

(86) PCT No.: PCT/FR01/03413

§ 371 (c)(1),
(2), (4) Date: Sep. 3, 2003

(87) PCT Pub. No.: WO02/36897

PCT Pub. Date: May 10, 2002

(65) Prior Publication Data

US 2004/0048046 A1    Mar. 11, 2004

(30) Foreign Application Priority Data

Nov. 6, 2000    (FR)    ................................ 00 14156

(51) Int. Cl.
*E04B 1/00*    (2006.01)
(52) U.S. Cl. .................. 52/222; 52/311.2; 52/746.1
(58) Field of Classification Search .............. 442/59, 442/79, 103, 136, 180, 85–88; 52/222, 311.1, 52/311.2, 506.06, 746.1; 428/195.1
See application file for complete search history.

(56) References Cited

U.S. PATENT DOCUMENTS

| | | | |
|---|---|---|---|
| 3,630,310 A | * | 12/1971 | Federer ..................... 181/210 |
| 3,782,495 A | * | 1/1974 | Nassof ....................... 181/284 |
| 4,194,329 A | * | 3/1980 | Wendt ......................... 52/145 |
| 4,248,647 A | | 2/1981 | Herron et al. |
| 5,031,721 A | * | 7/1991 | Barden et al. .............. 181/210 |
| 5,622,108 A | * | 4/1997 | Benedetto et al. .......... 101/126 |
| 6,596,658 B1 | * | 7/2003 | Putnam et al. ............. 442/384 |
| 6,951,680 B1 | * | 10/2005 | Vaulot .................... 428/195.1 |
| 2005/0214511 A1 | * | 9/2005 | Vogt et al. ................. 428/172 |

FOREIGN PATENT DOCUMENTS

| | | |
|---|---|---|
| FR | 2619531 | 2/1989 |
| FR | 2738847 | 3/1997 |
| WO | WO9107541 | 5/1991 |

\* cited by examiner

*Primary Examiner*—Naoko Slack
*Assistant Examiner*—Chi Q. Nguyen
(74) *Attorney, Agent, or Firm*—Gibbons, Del Deo, Dolan, Griffinger & Vecchione

(57) ABSTRACT

The invention concerns a method for producing a panel substantially stretched on a frame stretched homogeneously in all directions. The panel (1) is obtained from a sheet cut out in web of soft textile material produced from knitted synthetic textile yarns forming deformable stitches in all directions. The textile web is coated with a coating mixture comprising an elastomeric polymerized polymer and a covering coloring substance. The peripheral edges of the sheet are engaged in retaining profiled sections (2) forming a closed frame (2) fixed on a support (3). Said sheet is stretched by local heating in at least a zone causing it to be heat-shrunk and stretched on the frame (2). The invention is applicable to false ceilings, advertising boards, and all types of wall decorations.

10 Claims, 1 Drawing Sheet

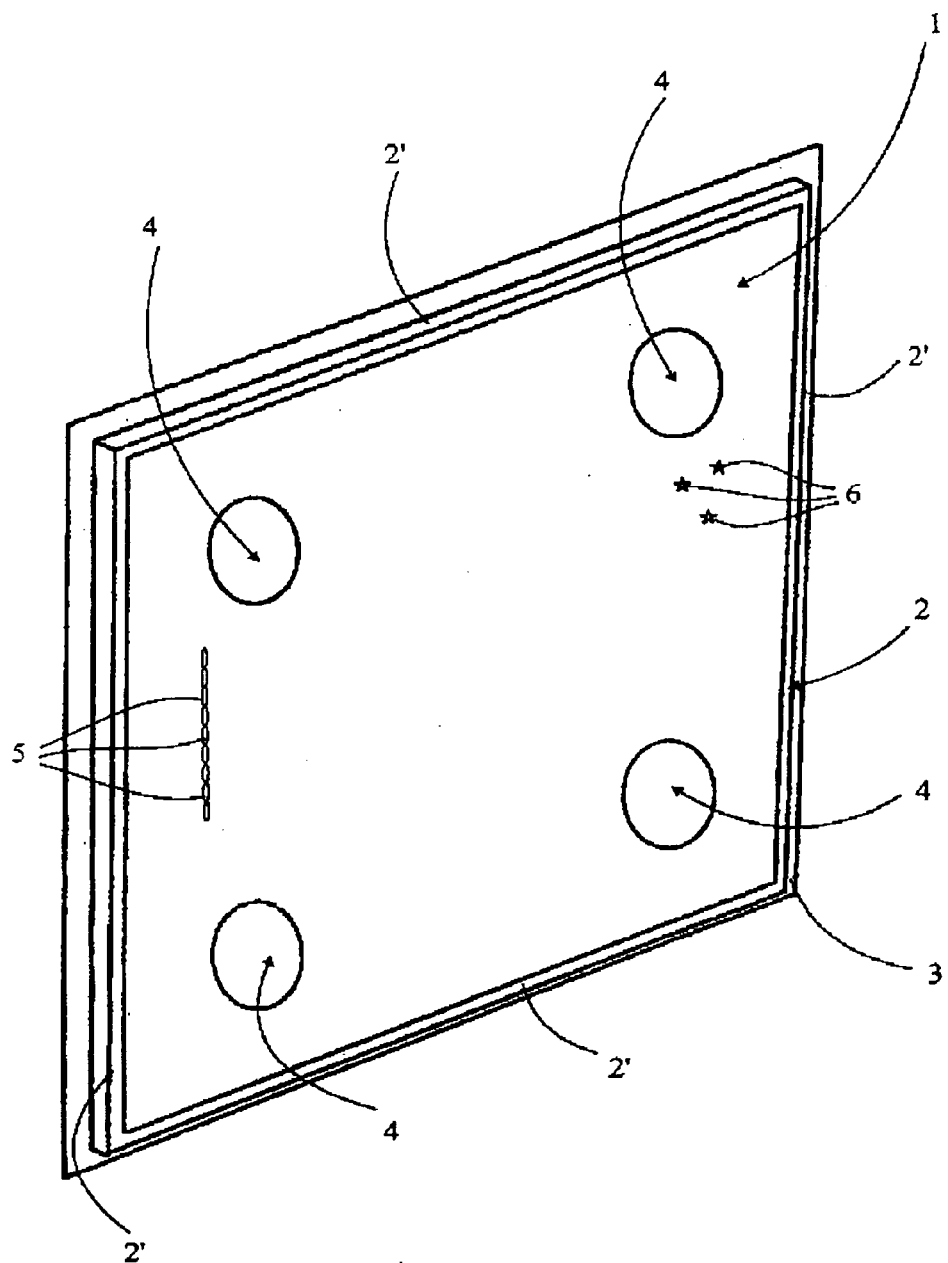
Figure

METHOD FOR PRODUCING A PANEL SUBSTANTIALLY STRETCHED ON A FRAME AND RESULTING PANEL

FIELD OF THE INVENTION

The present invention relates to a method for producing a panel stretched over a frame, this panel being manufactured from a flexible and heat-shrinkable textile material, and it relates to a panel obtained according to said method.

BACKGROUND OF THE INVENTION

Different methods for production of flat panels are known, particularly for production of false ceilings in the construction field.

A first solution consists of using widths of PVC, fused and factory pre-assembled in order to form a sheet. This sheet is then secured along its edges to a frame formed, for example, by means of profiled fastening sections. In order to obtain a suitably taut panel, placement of the sheet must be entrusted to an expert, and requires specific equipment.

A second solution, easier to implement, consists of using sheets produced from non-woven materials. These materials can be painted and can have decorative patterns. Easy to install, they make possible frequent changes in decor, but they need to be taut in order to avoid any folding or buckling phenomena. This tightening is generally difficult, and does not enable one to obtain homogeneous tension in all directions of the sheet.

A third solution, particularly described in the publication FR-A-2 552 473, consists of using a heat-stretchable sheet. Before attachment to the frame, the sheet is subjected to a large temperature increase in order to stretch it. In its stretched state, it is attached along its edges in a frame formed by retaining profiled sections. The source of heat is then eliminated so that the sheet contracts by cooling and tightens on the frame. Before it is placed, this sheet must be cut precisely to dimensions that are compatible with those of the frame, anticipating its percentage of stretching and contraction. Cutting to dimensions which are too small will not allow this sheet to be stretched enough to secure it to the frame. Cutting to dimensions which are too large will generate waste and therefore extra material cost. Moreover, in order to enable stretching the sheet, and to obtain, after attachment, a homogeneous tension over its whole surface, the sheet must be heated entirely in one pass to a temperature of approximately 50–60° C. In order to obtain this homogeneous temperature rise, the whole room in which the sheet is going to be placed must be heated to this temperature. Consequently, this method is difficult to use in large rooms and by non-specialized persons. It generates high costs of implementation, as well as difficult work conditions for the placement personnel. Moreover, this heating can cause deterioration of other elements present in the room (furniture, floor covering, . . . ).

A fourth solution, particularly described in the publication FR-A-2 619 531, consists of using a heat-shrinkable cloth secured on the frame; the cloth is attached, not tightly, to the frame and is then subjected to a large temperature increase allowing it to contract and tighten on the frame. This cloth is, for example, produced from PVC. This method thus makes it possible to produce a panel simply, and without requiring the involvement of experts. Nevertheless, this method does not allow one to obtain an optimal result, since the panel is not homogeneously taut in all directions.

Therefore, there is no solution providing a satisfactory response to the problem that is posed.

SUMMARY OF THE INVENTION

The present invention therefore aims to remedy this problem by proposing a method for producing panel, making it possible to obtain simply, economically, under good work conditions, and without influence on the environment, a panel, even of large dimensions, that is homogeneously taut in all of its directions. The invention also proposes a panel which is produced in the form of a single piece with no sewing or fusing, which can have large dimensions, and which allows one to tension it homogeneously in all directions and in a way that is currently unequalled.

For this purpose, the invention relates to a method for producing a panel of the type indicated in the preamble, characterized by the fact that it comprises the steps of:

manufacture of a strip of a flexible textile material from synthetic textile threads according to a knitting method in order to form meshes that can be deformed in all directions, coating the flexible textile material on at least one of its sides by means of a coating mixture containing at least one polymer with elastomeric characteristics in the polymerized state, and a covering coloring substance, polymerization of the polymer contained in the coating mixture, cutting a sheet from the flexible textile material whose dimensions are slightly greater than those of the frame, attaching the frame to a partition or ceiling, this frame being made up of retaining profiled sections forming a closed frame, engaging the peripheral edges of the sheet in said retaining profiled sections and, local heating at least one zone of the sheet in order to bring about the heat shrinking of the textile material.

The edges of the sheet extending past the retaining profiled sections are preferably cut off flush with said retaining profiled sections and/or the excess is fitted into said profiled sections by means of a spatula.

According to an advantageous characteristic, the synthetic textile threads constituting the basis of the flexible textile material include heat-shrinkable polyester threads.

According to another advantageous characteristic, the coating mixture moreover contains a flame retardant substance.

According to a preferred embodiment, the coating mixture consists of a paste which is deposited in the form of at least one extruded rope over at least a part of the width of the flexible textile material and which is made to penetrate into the meshes of the textile material before polymerization of the polymer contained in the coating mixture is effected.

The polymer contained in the coating mixture preferably contains polyurethane.

The covering coloring substance advantageously further contains titanium oxide and/or colored pigments and/or decorative elements present at least in a form chosen from the group comprising at least powders, flakes, granules, films of mineral and/or synthetic substances, and/or a mixture of these elements.

According to an advantageous embodiment, the sheet is printed according to a digital printing method.

The frame is preferably formed with retaining profiled sections having two opposite clamping jaws.

The invention also relates to a panel stretched on a frame attached to a support, this frame consisting of retaining profiled sections forming a closed frame, characterized by the fact that it is produced from a sheet whose dimensions are slightly greater than those of the frame which is to be produced, this sheet being cut from a textile strip produced from synthetic textile threads according to a knitting method in order to form meshes that can be deformed in all directions, this textile strip being coated on at least one of its sides by means of a coating mixture containing at least one polymer having elastomeric characteristics in the polymerized state and a covering coloring substance, the polymer contained in the mixture being polymerized, the peripheral edges of the sheet being engaged in the retaining profiled sections constituting the frame, the edges of the sheet extending past the profiled sections being cut flush with the retaining profiled sections after local heating of the sheet arranged so as to bring about heat shrinking and tightening of it.

According to a particularly advantageous embodiment, the panel has, at least on a part of one of its sides, at least one digitally printed image, chosen, for example, from the group that comprises at least a decorative image, an advertising representation, a drawing, an inscription.

According to another embodiment, the panel advantageously has a surface treatment obtained by at least one method chosen from the group which comprises at least ultraviolet binding, molecular grafting.

This surface treatment is preferably arranged so as to give the panel properties chosen from the group which comprises at least antiseptic, insecticidal, antistatic, disinfectant properties.

BRIEF DESCRIPTION OF THE DRAWING

The present invention and its advantages will appear more clearly in the following description of an embodiment example, with reference to the FIGURE representing a panel obtained by the method according to the invention.

DETAILED DESCRIPTION OF THE INVENTION

With reference to the FIGURE, the method for producing a panel 1 stretched on frame 2 comprises the successive steps described hereafter.

In a first step, a strip of flexible textile material is manufactured from synthetic textile threads, for example, by means of a knitting method, this flexible textile material having meshes 5 which can be deformed in all directions. The threads are in particular heat-shrinkable textile threads of polyester or any other equivalent textile material.

In a second step, one or both sides of the strip is (are) coated with a coating mixture containing a polymer which is elastomeric in the polymerized state. This polymer contains, for example, polyurethane or any other equivalent material. The polyurethane coating in particular gives the textile material a smooth and uniform aesthetic appearance. The coated flexible textile material moreover has the advantage that it is impermeable to dust, is washable, and can be painted with any commercially available paint or can be printed.

The coating mixture can contain a flame retardant substance allowing the panel 1 that is produced to be protected from flames and to be classified as fireproof class M1.

The coating mixture can also contain a covering coloring substance making it possible to obtain a panel 1 whose appearance is even more uniform over its whole surface in a given color. It is possible to use, for example, a coloring substance moreover containing titanium oxide. This coloring substance can also contain colored pigments and/or decorative elements such as, for example, powders, flakes, granules, films of mineral and/or synthetic substances and/or a mixture of these elements.

The coating mixture consists, for example, of a paste which is deposited over the whole width of the flexible textile material and on both sides of this flexible textile material in the form of extruded ropes, for example, one rope per side. The strip of flexible textile material is present, for example, in the form of a spool and is unwound longitudinally under a depositing nozzle which is given an alternating transverse movement, for example, making possible the deposition of extruded ropes over the whole width of the flexible textile material. This paste is forced on both sides to penetrate inside the meshes of the flexible textile material, for example, between two pressing rollers which also allow the deposit to be evened out over the whole surface of the strip. It is completely possible to envisage depositing only a single extruded rope on one side of the strip. In that case, the paste will be made to penetrate in such a way that it passes through the flexible textile material and emerges on the non-coated side so that it can be distributed over the whole surface of the flexible textile material. Suitable distribution of the paste can also be obtained by using scrapers replacing or supplementing the use of the rollers. Coating of both sides of the flexible textile material can be done in a single operation, or in two successive operations between which the flexible textile material is turned over. The paste deposited in the form of an extruded rope can be made fluid, for example, by means of heating with ultrasound, which facilitates its penetration into the flexible textile material.

In a third step, the polymer contained in the coating mixture is polymerized in order to give the flexible textile material the elastomeric characteristics belonging to the polymer that is used, in particular its heat shrinking characteristic. One thus obtains a heat shrinkable flexible textile material that can, for example, be put in the form of a roll and unwound as needed. During this polymerization step, the lateral edges of the flexible textile material are preferably held, for example, by means of a spiked chain, in order to prevent the flexible textile material from undergoing excessive heat shrinking effects.

In a fourth step, a sheet is cut from the flexible textile material thus obtained that is intended to form panel 1. This sheet is cut such that its dimensions are slightly greater than those of frame 2. As explained in the rest of the description, this cutting does not have to be done with special precision. During this cutting, heat shrinking of the sheet will of course be anticipated. In a non-limiting manner, the percentage of contraction of this type of textile material is on the order of 5 to 10%.

In a fifth step, frame 2 is attached to support 3 in the form of a partition or ceiling. This frame 2 consists of retaining profiled sections 2', for example, four of them, each having, for example, two opposite clamping jaws (not represented). These retaining profiled sections 2' are arranged so as to form a closed frame. Retaining profiled sections 2' can also be attached to different supports 3 in order to produce a panel 1 between two walls or a panel 1 installed vertically on the floor.

In a sixth step, the peripheral edges of the sheet are engaged between the clamping jaws of retaining profiled sections 2'. The sheet secured along its peripheral edges is pre-stretched when it is placed on frame 2.

In a seventh step, the sheet is heated locally at the places having folds or lack of tension in order to bring about heat shrinking of the flexible textile material. To do this, the heating end of a heat gun, mounted, for example, on a mobile carriage, is positioned at distance of approximately 20 to 30 cm from the sheet facing the predetermined zone of the sheet that is to be tightened. The heat gun is possibly moved to a second zone. Preferably, the heat gun is moved, for example, according to a straight line trajectory shifted from one line to another for the purpose of sweeping the whole surface of the sheet. The use of a localized heat source in the form of a heat gun heated to approximately 200° C. makes it possible to obtain a rapid contraction of each heated zone of the sheet without the need to heat the whole room, which remains at room temperature. It is thus possible to produce panel 1 stretched from a single piece in large rooms, in a rapid, simplified manner without risk of deterioration of the surface coverings or furniture present in the room. The step of placement of panel 1 therefore takes place in a room-temperature environment, and does not generate work conditions that are difficult for the placement personnel.

Depending on the dimensions of the sheet, it is possible to cut the edges of the sheet which extend past retaining profiled sections 2' flush with these retaining profiled sections 2'.

Thus, no part of the sheet surrounding panel 1 remains. This step makes it possible, on the one hand, not to have to cut the sheet with special precision, and moreover to obtain a suitable finishing level for panel 1. In order to obtain a similar result, it is also possible to insert the projecting edges of the sheet, into profiled fastening sections 2'. This cutting and/or insertion can take place before or after the heat shrinking step. Before attachment of the sheet, it is possible to provide for it be printed, for example, by means of a digital printing method.

This type of process allows the production of a panel 1 stretched on frame 2 in order to form a partition, ceiling 3, or an advertising panel. This panel 1 has a mechanical strength up to fifteen times greater than that of conventional surface coverings, for example, made of PVC. Moreover, this panel 1 can have, at different locations of its covering surface, cutouts 4 forming decorative patterns, or holes provided for integrating spotlights.

It is easy to modify the aesthetic appearance of panel 1 by integrating decorative elements, [or] pigments in the coating mixture that is used, during the production method; or after placement of panel 1, by printing an image, by painting, or by any other equivalent means. Panel 1 can also be reversible and have a different décor on each side. The image 6 can be a decorative image, an advertising representation, a drawing, an inscription, or any other type of image.

According to an embodiment variant of particular interest, panel 1 has a surface treatment which is obtained, for example, by ultraviolet binding, molecular grafting, or any other equivalent method. This surface treatment makes it possible to give panel 1 antiseptic, insecticidal, antistatic, disinfectant, or any other suitable property.

INDUSTRIAL APPLICATION POSSIBILITIES

Panel 1 and its method of production can of course be used to produce any type of panel 1, for example, a wall covering for the purpose of carrying out wall decoration as well as taut suspended ceilings. Profiled fastening sections 2' used in this method for installing suspended ceilings can be of different types.

This description clearly demonstrates that the invention allows all the objectives to be attained, and particularly makes it possible to obtain a homogeneous tension of panel 1 in all directions while allowing simple, rapid, and economical production. The present invention is not limited to the embodiment example that has been described, but extends to any modification and variant obvious to the expert in the field, while remaining within the scope of the protection defined in the appended claims.

What is claimed is:

1. A method for producing a panel, stretched in a frame, especially for making a stretched or false ceiling and/or a wall panel, said panel being formed from a flexible and heat-shrinkable textile material, comprising:
    providing a fabric piece of said flexible and heat-shrinkable textile material comprising knitted synthetic threads in order to form meshes that can be deformed in all directions;
    coating said flexible and heat-shrinkable textile material on at least one of its sides by means of a coating mixture containing at least one polymer with elastomeric characteristics in the polymerized state and a covering coloring substance;
    cutting a sheet from said flexible and heat-shrinkable textile material, previously coated with the coating mixture with said polymer being polymerized;
    attaching said frame to a support, especially a ceiling or a wall, said frame being made of retaining profiled sections forming a closed designed frame;
    engaging peripheral edges of said sheet in said retaining profiled sections to mount the sheet in the frame; and
    heating at least one zone of said sheet in order to perform the heat shrinking of the flexible and heat-shrinkable textile material for providing said panel.

2. The method according to claim 1, further comprising cutting edges of said sheet extending past said retaining profiled sections flush with said retaining profiled sections.

3. The method according to claim 1, wherein said synthetic textile threads constituting said flexible and heat-shrinkable textile material include heat-shrinkable polyester threads.

4. The method according to claim 1, wherein said coating mixture further contains at least one flame retardant substance.

5. The method according to claim 1, wherein said coating mixture consists of a paste, and said method further comprises depositing said paste in the form of at least one extruded rope over at least a part of the width of said flexible and heat-shrinkable textile material, wherein said coating mixture penetrates into the meshes of said flexible and heat shrinkable textile material.

6. The method according to claim 5, wherein said polymer in said coating mixture contains polyurethane.

7. The method according to claim 1, wherein said covering coloring substance includes titanium oxide.

8. The method according to claim 1, wherein said covering coloring substance includes color pigments.

9. The method according to claim 1, wherein said covering coloring substance includes decorative elements at least in the form chosen from the group comprising powders, flakes, granules, films of mineral and/or synthetic substances, and/or a mixture thereof.

10. The method according to claim 1, wherein said flexible and heat-shrinkable textile material is submitted to a digital printing technique.

* * * * *